US009751017B2

(12) United States Patent
Thoroddsen et al.

(10) Patent No.: US 9,751,017 B2
(45) Date of Patent: Sep. 5, 2017

(54) SYSTEM AND A METHOD FOR PLAYING AND MANAGING AN INTERACTIVE SOCIAL GAME BETWEEN A PLURALITY OF CLIENT COMPUTERS CONNECTED TO A NETWORK

(75) Inventors: Jon F. Thoroddsen, Reykjavik (IS); Sigurdur Jonsson, Kopavogur (IS)

(73) Assignee: JF936 ehf, Reykjavik (IS)

( * ) Notice: Subject to any disclaimer, the term of this patent is extended or adjusted under 35 U.S.C. 154(b) by 1043 days.

(21) Appl. No.: 13/478,807

(22) Filed: May 23, 2012

(65) Prior Publication Data

US 2013/0316793 A1    Nov. 28, 2013

(51) Int. Cl.
*A63F 13/795* (2014.01)
*A63F 13/61* (2014.01)

(52) U.S. Cl.
CPC ............ *A63F 13/795* (2014.09); *A63F 13/61* (2014.09); *A63F 2300/5506* (2013.01); *A63F 2300/556* (2013.01)

(58) Field of Classification Search
None
See application file for complete search history.

(56) References Cited

U.S. PATENT DOCUMENTS

| | | | | |
|---|---|---|---|---|
| 6,155,924 | A * | 12/2000 | Nakagawa et al. ............... | 463/4 |
| 8,678,893 | B2 * | 3/2014 | Suzuki et al. .................... | 463/4 |
| 2001/0031655 | A1 * | 10/2001 | Tanibuchi et al. ................ | 463/3 |
| 2003/0224856 | A1 * | 12/2003 | Bukovsky ............... | A63F 13/12 463/42 |
| 2004/0109003 | A1 * | 6/2004 | Takata ................... | G06T 11/001 345/552 |
| 2005/0216346 | A1 * | 9/2005 | Kusumoto ............. | G06Q 30/02 705/14.12 |
| 2007/0079326 | A1 * | 4/2007 | Datta et al. ...................... | 725/34 |
| 2008/0065481 | A1 * | 3/2008 | Immorlica et al. ............. | 705/14 |
| 2008/0161113 | A1 * | 7/2008 | Hansen et al. .................. | 463/42 |
| 2009/0325685 | A1 * | 12/2009 | Webb et al. .................... | 463/25 |
| 2014/0349765 | A1 * | 11/2014 | Namgoong et al. ............ | 463/42 |

FOREIGN PATENT DOCUMENTS

KR      20070003275 A  *  1/2007  ............. G06Q 50/10

OTHER PUBLICATIONS

Tiger Woods PGA Tour 2004, Jan. 10, 2004, http://www.ign.com/faqs/2004/tiger-woods-pga-tour-2004-walkthrough-456221, pp. 75-76.*

* cited by examiner

*Primary Examiner* — Tramar Harper
(74) *Attorney, Agent, or Firm* — Workman Nydegger

(57) ABSTRACT

A system for playing and managing an interactive social game between a plurality of client computers connected to a network in a communications network includes a processor for playing an interactive social game program at the plurality of client computers operated by users. The interactive social game program includes associating the users of the client computers with social item(s) to be managed. The processor is operable to present the users of the client computer with stored promotions in memory. The processor is operable to cause the execution of the social game program in response to an input command, to incorporate a selected promotion and present the selected promotion visually to client computers while playing the interactive social game.

20 Claims, 9 Drawing Sheets

| POS | CLUB | PLD | W | D | L | F | A | GO | PTS |
|---|---|---|---|---|---|---|---|---|---|
| 1. | F.C. Guttenberg | 38 | 28 | 5 | 5 | 83 | 27 | 56 | 89 |
| 2. | Shawshank United | 38 | 24 | 11 | 3 | 54 | 24 | 40 | 83 |
| 3. | AMB 1846 | 38 | 20 | 8 | 10 | 57 | 27 | 30 | 68 |
| 4. | Stockholm Saints | 38 | 19 | 11 | 8 | 63 | 35 | 28 | 68 |
| 5. | F.C. Roundtrip | 38 | 17 | 9 | 12 | 57 | 54 | 3 | 60 |
| 6. | Green Giants F.C. | 38 | 15 | 13 | 10 | 52 | 36 | 16 | 58 |
| 7. | RAM United | 38 | 16 | 8 | 14 | 47 | 52 | -5 | 56 |
| 8. | Cincinatti Flames | 38 | 16 | 7 | 15 | 52 | 47 | 5 | 55 |
| 9. | Amron Ecletics | 38 | 14 | 12 | 12 | 45 | 42 | 4 | 54 |
| 10. | Andizza Morgz | 38 | 15 | 7 | 16 | 52 | 54 | -2 | 52 |
| 11. | Blue Streak Stars | 38 | 11 | 17 | 10 | 45 | 41 | 2 | 50 |
| 12. | Alloa Athletic | 38 | 12 | 10 | 16 | 44 | 49 | -5 | 46 |
| 13. | Urwitchen Tango Club | 38 | 11 | 10 | 17 | 38 | 47 | -9 | 43 |
| 14. | F.C. Sampa | 38 | 11 | 9 | 18 | 29 | 44 | -15 | 42 |
| 15. | Spades | 38 | 12 | 5 | 21 | 35 | 59 | -24 | 41 |
| 16. | Oklahoma Starks | 38 | 8 | 15 | 15 | 38 | 50 | -22 | 39 |
| 17. | Komrades | 38 | 10 | 8 | 20 | 37 | 59 | -22 | 38 |
| 18. | RVK Shields | 38 | 10 | 8 | 20 | 32 | 55 | -23 | 38 |
| 19. | Happy Town Family | 38 | 8 | 10 | 20 | 34 | 60 | -26 | 34 |
| 20. | A.N.D.Y. | 38 | 5 | 13 | 20 | 29 | 59 | -30 | 28 |

FIG. 9

SYSTEM AND A METHOD FOR PLAYING AND MANAGING AN INTERACTIVE SOCIAL GAME BETWEEN A PLURALITY OF CLIENT COMPUTERS CONNECTED TO A NETWORK

FIELD OF THE INVENTION

The present invention relates to, in a communications network, a system and a method for playing and managing an interactive social game between pluralities of client computers connected to a network.

BACKGROUND OF THE INVENTION

Large numbers of fans and enthusiasts spend a large amount of money each year on activities relating to real-life events such as sporting events. Professional baseball, basketball, football, soccer, and hockey, to name just a few, reap billions of dollars in revenues each year. By way of cable and satellite television, viewers can now watch virtually any type of sporting event that occurs in most places in the world. If not directly accessible by television, the user can access such events via the Internet.

One source of entertainment related to events of this type is provided by software companies that develop computer games of sports that allow a user to play in the game in a virtual setting and compete against other users. The existing computer games of sports have in common that the game closely follows the manner in which e.g. professional football games are played where the aim is to win the games that are being played. However, most if not all these games have in common that the players are in no way responsible for managing the teams and individual players as is being done in real life.

The inventor of the present invention has appreciated that there is thus a need for an improved system for playing sport game were the player is responsible for a given sport team and where special attention is given to social activities such as financial managing of the sport team, management of the individual players of the team and daily operations for the team and has in consequence devised the present invention.

SUMMARY OF THE INVENTION

It would be advantageous to achieve an interactive social game system that presents an appealing online social game system and a method that will attract sport enthusiasts worldwide.

According to a first aspect of the invention, in a communications network, a system for playing and managing an interactive social game between pluralities of client computers connected to a network is provided, comprising:
  a processor for playing an interactive social game program at said plurality of client computers operated by users, the interactive social game program including associating the users of said client computers with social item to be managed;
  a memory for storing promotions from plurality of potential advertisers, said processor being operable to present the users of said client computer with said stored promotions; and
  an input unit for receiving an input command from a user selected from said users indicating a promotion of interest, said processor being operable to cause the execution of said social game program in response to said input command and to incorporate said selected promotion to the social item associated to said user and present the selected promotion visually to said user and at least some of the remaining users of said client computers while playing said interactive social game with said user.

Accordingly, by selection the promotion of interest the promotion will appear as a part of the game both at the user side that selected the promotion as well as at the other client sides that are playing the game with said user. Therefore, a commercially advantageous solution is provided for distributing promotions via said communication network, which appears as a part of the game, and where the users/players of the game do not experience this as a real commercial. Thus, if a user A has selected a given commercial and is competing or playing with user B, this commercial will also appear at the user B side that may be located somewhere in the world and will appear as a part of appearance of the social item associated to user A.

In one embodiment, said interactive social game is a sport game and wherein said social item to be managed is a sport team consisting of plurality of sport team players. The sport team as such may be managed, or the individual players of the sport team, or both the players and the sport team. Accordingly, by incorporate said selected promotion to the social item can be that the user selects a given promotion and this promotion may appear as a sponsor for the sport team and appear on the teams outfit, or the teams stadium etc., just as in real life.

In one embodiment, said input unit is further operable to receive a selection command from said user indicating a team selection and where said team associated to the user is based on said selection command. The selection command may be selected from the non-limiting list of one or more of the following: name of the team, or overtaking an existing team, or changing name of an existing team, or selecting outfit for the team. The user can thus customize the team to his/her own need, where e.g. the user's favorite colors may be reflected in selecting the outfit for the team. The scenario where the name of the team is changed could e.g. be if the user moves from one community to another community where the new team name is the name of the new community where the user is living in.

In one embodiment, the processor is operable to add or remove credit points associated to the team in response to decision events made by the user. In one embodiment, these credit points form a financial capacity for said team and where the financial capacity may be increased or decreased via said decision events where credit points are added or removed. In that way a dynamic way is provided allowing the user to operate the team and/or the team players as a sport club in real life where the user is responsible for different decision and can profit based on good decision and the consequences for not so good decisions. It is obvious that it is not an easy task to run a sport club and requires considerable financial insight but a sport club not only generates income, but also considerable expenditures. The user of said team must accordingly find a sustainable balance between the two.

In one embodiment, said decision events when credit points are added and associated to the team are selected from one or more of the following non limiting decision events: making promotion deals to said potential advertisers, or selling players in the team, or increase number of seats of a stadium associated to said sport team and thus the ticket sales, or increase ticket price in home games, or winning games, or making tie in games.

In one embodiment, the decision events when credit points are removed from the team are selected from one or more of the following decision event: making investments in buying new team players, or making investments by increase number of seat of a stadium associated to said sport team, or making investment by buying a new trainer for the team, or making investment by buying an assistant for the team, or loosing games.

In one embodiment, the decision events when credit points are added and associated to the team is when the user selects promotion from said plurality of potential advertisers, where at least two of said promotions have different associated credit points. The fact that different promotions may have different associated credit points may encourage user to select one unknown brand instead of another well known brand, simply because the former brand gives more credit points. In that way, the distribution of the brands selected by the users becomes more natural where small unknown brands that might otherwise not be selected will be selected by the users.

Accordingly, said interactive social game imitates financial operation of a real life scenario where difficult decision must be made which requires some difficult investment decisions, which later on reveals that the investment was actually a good investment that provides additional credit points. As an example, making an appropriate investment by increasing the number of seats in the stadium may reveal as being a good investment via increase number in the ticket sale.

In one embodiment, the players of the team are associated with statistical data indicating their strength and weakness. In one embodiment, this statistical data are dynamical data that may be automatically adjusted in favor or against the player in response to a task selected by the user. In one embodiment, the task is a training task that is triggered via a selection command from said user via said input unit. In one embodiment, the training task is selected from one or more of the following non limiting training tasks: tactical training task, physical training task, or mental training task. The players of the team can thus be improved via increasing the number of exercises, or via building up the user's self-confidence etc. just like in real life. Thus, finding e.g. the right balance between the numbers of trainings vs. the number of times the user selects a mental training task may be very important to improve said statistical data in the most optimal way.

In another embodiment, said statistical data are automatically adjusted in favor of the player by selecting the player in the starting lineup and increase the number of trainings. Thus, by selecting a given player in the starting lineup the player both gets more playing experience, which, as in real sport, gets more self-confidence and therefore becomes a better player. Regarding the number of trainings, it is of course a training number threshold that must be taken into account. As an example, it may not be wise to let a given player train five times a day, because then there is a risk of injuries, which is the same for a real player. Accordingly, said system is capable of simulating a real team where all decision event must be carefully considered.

In one embodiment, additional credit points are associated to said player when the statistical data are adjusted in favor of the player. Accordingly, if the dynamical data are adjusted in favor of the player because e.g. the player has in the last games been in the starting lineup and therefore gained much playing experience and has also been training intensively (but up to an appropriate limit) the player becomes more valuable. The user that is managing the game may then as an example sell the player and get additional credit points. Such a decision must however be considered carefully because the team will not be as strong in the absence of this player which might result in less winnings in the coming future.

In one embodiment, the advertiser of said selected promotion acts as a sponsor in said interactive social game for team associated to said user and credit points are associated to the team. By selecting as an example NIKE® as a sponsor for the team the user gets credit points, but the credit points may as an example depend on how long the contract is between the team and NIKE®. The contract may e.g. only be one season or two seasons etc., where the two season contract would give more credit points that a one season contract. Also, the user may in one embodiment make revoke the contract and make a new contract with another sponsor.

In one embodiment, said input unit is further operable to receive a selection command from said user indicating a selection of players for said team and where said players associated to the user is based on said selection command. The user may thus manually select out the players from a pool of players, where it is up to the user to estimate the most preferred statistics of the individual players so that the outcome of the team will be maximized.

It should be noted that said interactive social game program may be programmed so that all input commands from said user, e.g. any of said investment decisions, acts as an input parameter in a computer algorithm that results in an output, e.g. via increasing or decreasing credit points. As an example, if the user of the game logs to the game twice a day and selects a training task for a given player via appropriate selection command, e.g. via mouse click, the algorithm may automatically adjust the statistical data associated to the user in favor of the player, and simultaneously adjusts that credit points associated to this player automatically. However, the computer algorithm may e.g. be programmed in a way that if a training task is selected more that e.g. 4 times within 24 hours, the computer algorithm may reduces the number of statistical data in non-favor of the player and automatically decrease the number of credit points associated to the user. Similar may apply for various investment decisions etc.

According to another aspect, the present invention relates to a method performed in a communications network of playing and managing an interactive social game between plurality of client computers connected to a network, comprising:

playing an interactive social game program at said plurality of client computers operated by users, the interactive social game program including associating the users of said client computers with social item to be managed;

storing promotions from plurality of potential advertisers;

presenting the users of said client computer with said stored promotions;

receiving an input command from a user selected from said users indicating a promotion of interest; and incorporating said selected promotion to the social item associated to said user and present the selected promotion visually to said user and at least some of the remaining users of said client computers while playing said interactive social game with said user.

In one embodiment of said method, said interactive social game is a sport game and wherein said social item to be managed is a sport team consisting of plurality of sport team players.

In one embodiment, said method further comprises receiving via a selection command from said user indicating a team selection and where said team associated to the user is based on said selection command, said selection command being selected from one or more of the following: name of the team, or overtaking an existing team, or changing name of an existing team, or selecting outfit for the team.

In one embodiment of said method, credit points are added or removed in response to decision events made by the user and where said credit points form a financial capacity for said team and where the financial capacity may be increased or decreased via said decision events where credit points are added or removed.

In one embodiment of said method, the decision events when credit points are added and associated to the team are selected from one or more of the following decision event:
  making promotion deals to a third party;
  selling players in the team;
  increase number of seats of a stadium associated to said sport team and thus the ticket sales,
  increase ticket price in home games;
  winning games;
  making tie in games;
  selecting promotion from said plurality of potential advertisers;
and where the decision events when credit points are removed from the team are selected from one or more of the following decision event:
  making investments in buying new team players;
  making investments by increase number of seat of a stadium associated to said sport team;
  making investment by buying a new trainer for the team;
  making investment by buying a assistant for the team; and
  loosing games.

In one embodiment of said method, the players of the team are associated with statistical data indicating their strength and weakness and where said statistical data are dynamical data that may be automatically adjusted in favor or against the player in response to a task selected by the user.

In one embodiment of said method, the task is a training task that is triggered via a selection command from said user via said input unit, said training task being selected from one or more of the following training tasks:
  tactical training task;
  physical training task; and
  mental training task.

In one embodiment of said method, said statistical data are automatically adjusted in favor of the player by selecting the player in the starting lineup and increase the number of trainings.

In one embodiment of said method, additional credit points are associated to said player when the statistical data are adjusted in favor of the player.

In one embodiment of said method, the advertiser of said selected promotion acts as a sponsor in said interactive social game for team associated to said user and credit points are associated to the team.

In one embodiment, the method further includes receiving a selection command from said user indicating a selection of players for said team and where said players associated to the user is based on said selection command.

In one embodiment of said method, method further includes allowing the user to set up his/her team.

According to a third aspect, the present invention relates to computer program product tangibly embodied on a computer-readable medium and including executable code that, when executed, is configured to cause one or more processors of a computing device to:
  play an interactive social game program at plurality of client computers operated by users, the interactive social game program including associating the users of said client computers with social item to be managed;
  store promotions from plurality of potential advertisers;
  present the users of said client computer with said stored promotions;
  receive an input command from a user selected from said users indicating a promotion of interest; and
  incorporate said selected promotion to the social item associated to said user and present the selected promotion visually to said user and at least some of the remaining users of said client computers while playing said interactive social game with said user.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 9 shows an overview of the previous league round where the user can see where his/her club ranks amongst the others and in that way the user can monitor the progress of his/her team.

DESCRIPTION OF EMBODIMENTS

Before explaining the present invention in details, it is to be understood that the invention is not limited to the particular embodiment and that it can be practiced or carried out in various ways.

Figure 1:
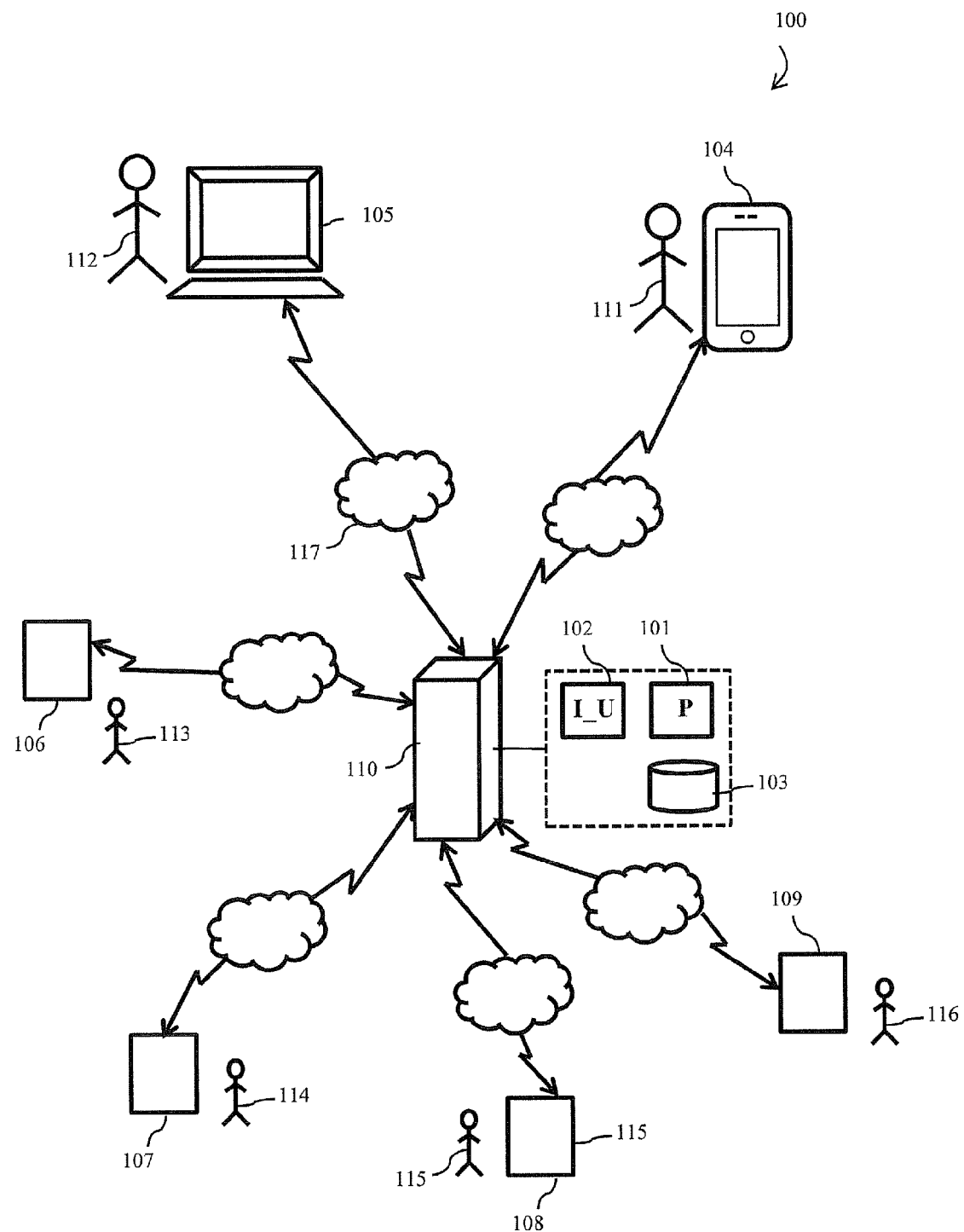
FIG. 1 depicts graphically a system according to the present invention for playing and managing, in a communication network, an interactive social game between plurality of client computers connected to a network.

FIG. 1 depicts graphically a system 100 according to the present invention for playing and managing, in a communication network, an interactive social game between plurality of client computers 104-109 connected to a network 117 such as the Internet where the system comprises a processor (P) 101, a memory 103 and an input units (I_U) 102.

The processor may be comprised in a central server 110 and is adapted to play an interactive social game program that may be stored at memory at the client computers operated by users 111-112. This interactive social game program may as an example be downloaded by the users 111-116 and stored locally at the client computers 104-109. This interactive social game program associates the users 111-116 of the client computers 104-109 with social item to be managed. The client computers may as an example be selected from a non-limiting list of any type of portable computer device 104 such as mobile phones or tablet computers or personal digital assistant (PDA), laptop or desk-top computers and the like.

In the following, it will be assumed that the social item is a sport team that consists of plurality of sport team players. The social item should however not be construed as being limited to a sport team, but the item may just as well be a computer animated person, an animal, e.g. a penguin, giraffe, a car etc., i.e. something that is interacting with other social items of other users. For simplicity, in the following it will be assumed that the item is a football team with 22 football players.

The memory 103 is adapted to store, among other things, promotions from plurality of potential advertisers. The promotions may as an example be in a form of a logo, brands, or advertisements, e.g. COCA COLA®, NIKE®, PEPSI®, or the promotions may be logos from sport clubs etc. The processor is operable to present the users 111-116 with these stored promotions by displaying the promotions on the display of the client computers.

The input unit is adapted to receive an input command from a user 111 selected from said users 111-116 indicating a promotion of interest. The input unit may as an example include a keyboard, a touch-screen device of e.g. a table computer or mobile phone, or a speech recognition system where the user can via speech select the promotion of interest.

The processor (P) 101 is operable to cause the execution of the social game program in response to the input command from the user and to incorporate the selected promotion to the social item associated to said user and present the selected promotion visually to the user 111 and also the remaining users 112-116 of the client computers 104-109 while playing the interactive social game. This means that if e.g. user 111 selects the brand NIKE®, this brand/logo will not only be e.g. the logo of the users team throughout playing the game, but it will also appear at the client computers 105-109 when playing a game with this particular user 111. Accordingly, a commercially advantageous solution is provided for distributing promotions via the communication network 117 which may as an example be the Internet. These potential advertisers may be external companies as mentioned here above that pay a third party that operates the system 100 on e.g. yearly basis, or each time a user selects their brand. This means that e.g. a company A may buy 1000 appearances, where one appearance may correspond when a given user selects this brand, in said system so that each time a user 111-116 selects the brand of company A this brand will be a part of the game worldwide when two or more players are playing the game.

In one embodiment, the input unit (I_U) 102 is further operable to receive a selection command from the user 111 indicating a team selection and where the team associated to the user is based on this selection command. This selection command may be, but is not limited to, one or more of the following selection commands: name of the team, overtaking an existing team, or changing name of an existing team, or selecting outfit for the team, selecting a name for the home stadium. In that way, the user may customize the team e.g. by selecting the name of the team, select the outfit for the team with the user's favorite color, changing the name of an existing team etc. The selected promotion may then appear on the team's outfit and appear at the team's stadium and even all appearances that may related to this team. This may as an example be if another external user 112-116 wants to be presented with information about this team where the requested information may then appear with this selected promotion.

This process of selecting the team, name of the team, stadium, uniform etc. might be the process at the very beginning of the game, or during the game where the user might want to change e.g. the name of the team. The scenario where the user overtakes an existing team may be when the team as been inactive for a certain amount of time, i.e. where the user that created that time is no longer playing the game.

In one embodiment, the processor (P) 101 is operable to add or remove credit points associated to the team in response to decision events made by the user(s) 111-116 and in that way the users 111-116 can financially manage the teams associated to the them as if they were a real sport clubs. These credit points therefore form a financial capacity for the team where the financial capacity may be increased or decreased via these decision events by adding or removing credit points. It is therefore up to the user to operate the team as if it would be a real team in real life. As an example, the decision events when credit points are added and associated to the team can be one or more of the following decision event: making promotion deals to said potential advertisers, selling players in the team, or increase number of seats of a stadium associated to said sport team and thus the ticket sales, or increase ticket price in home games, or winning games, or making tie in games.

Also, the number of credit points may be linked to the time indicator, where the user may get more credit point for longer sponsorship deal. Lets say that the user selects a particular brand, he/she may be associated with 10.000 credit points and if the user makes let's say 2 years deal with this potential advertiser he may be associated with more credit points, e.g. 15.000 credit points.

Similarly, decision events when credit points are removed from the team are selected from one or more of the following decision event making investments in buying new team players, or making investments by increase number of seat of a stadium associated to said sport team, or making investment by buying a new trainer for the team, or making investment by buying a assistant for the team, or loosing games. These decision events should of course be construed as being limited to only these decision events.

In one embodiment, different promotions may have different associated credit points and that are present to the user. The fact that different promotions may have different associated credit points may encourage user to select one unknown brand instead of another well known brand, simply because the former brand gives more credit points. In that way, selection distribution of the brands becomes more natural where small and unknown brands that might otherwise not be selected will indeed be selected by the users because of this larger number of credit points. Accordingly, a very know company A may give 10.000 credit for one season whereas other less know or maybe unknown company B may give 12.000 credit points for the same time period.

In one embodiment, the players of the team are associated with statistical data indicating their strength and weakness, but this statistical data may be dynamical data that may be automatically adjusted in favor or against the player in response to a task selected by the user such as via different training task. As an example, each player may be divided into several categories, e.g. attack, power, skill etc., where each category is shown in percentage from 0-100, where zero is the lowest and 100 is the highest. This means that the user that is managing the team selects a training task and the type of the training task. The processor (P) 101 will then process this selection made by the user and instruct the interactive social game program to update update this data accordingly. As an example, if the user is very active and plays the game several times a day, and selects various training tasks for different players, this statistical data will be updated accordingly, based on the different type of training task. As an example, the training task be selected from one or more of the following training tasks: tactical training task, physical training task, mental training task. In that way, the system 100 can animate the result of the various trainings as if the players would be real players. It should of course be noted that it may also be dangerous to select too much training. If as an example the frequency of training is above certain threshold value, e.g. above four trainings a day the processor (P) 101 may adjust the data by reducing the percentages within a certain category, e.g. the category "power" may be reduced from 92% down to 60%. Therefore, the user must find the right balance in training, just as in real life. Other scenarios where this data is adjusted in favor of the player is when the player is selected by the user in the starting lineup, but just as in real life, by selecting a given player in the starting lineup the player both gets more playing experience and more self-confidence and therefore becomes a better player.

In one embodiment, each player has associated credit points, which reflects the value of the player. This means that the user that is managing the team can sell the player, and buy other players. Therefore, the credit points are adjusted in accordance with the statistical data meaning that if the statistical data are adjusted in favor of the player the number of credit points is increases, i.e. said computer program couples said data with the number of credit points. In the same way, if the user takes some bad decisions regarding the training of the player so that the data are reduced the value/credit points will then also be reduced.

In one embodiment, there is a match every day where the user 111 lines up his/her team, e.g. by choosing the best players, depending on the opponent, or by selecting less experienced players. The user may be presented with statistical data about the opponent, e.g. number of victories in this or previous seasons, see statistical data associated with the players etc. and based thereon decide the line-up. If the statistical data of the opponent show that the opponent has lost games in the last five matches, it might as an example be wise to select several less experienced players in the line-up and in that way improve the statistical data of these less experienced players and thus the value of these players.

In one embodiment, the user 111 may via said input unit select a coach and/or assistant, where the coach and/or the assistant may also be associated with statistical data indicating how good they are. It may namely happen that the user 111 forgets to log into the game and therefore miss a match. However, the role of such a coach and/or the assistant may be to automatically select a line-up for the team in the absence of the user.

Figure 2:
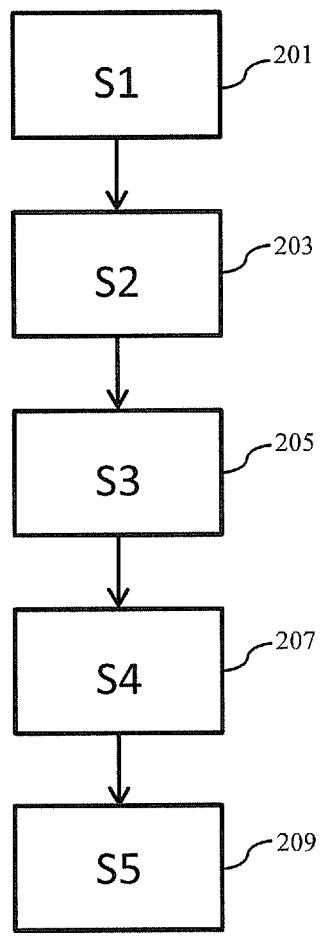
FIG. 2 shows a flowchart of a method according to the present invention of playing and managing an interactive social game in a communication network between plurality of client computers connected to a network.

FIG. 2 shows a flowchart of a method according to the present invention of playing and managing an interactive social game in a communication network between plurality of client computers connected to a network.

In a first step (S1) 201, an interactive social game program is played at the plurality of client computers operated by users where the users are associated with a social item social item to be managed, but this social item may e.g. be a football club consisting of e.g. 22 players.

In a second step (S2) 203, promotions from plurality of potential advertisers are stored in a memory.

In a third step (S3) 205, these promotions are presented to the users of the client computers.

In a fourth step (S4) 207, a promotion of interest is selected by the users via an input command.

In a fifth step (S5) 209, the selected promotion is incorporated to the social item associated to the user and presented visually to the user and the remaining users of said client computers while playing said interactive social game.

Different embodiments of said steps have already been discussed in relation to FIG. 1

FIGS. 3-10 depict one example of a system and a method according to the present invention, seen from a point of view of one user selected from said users shown in FIG. 1.

Figures 3, 4:
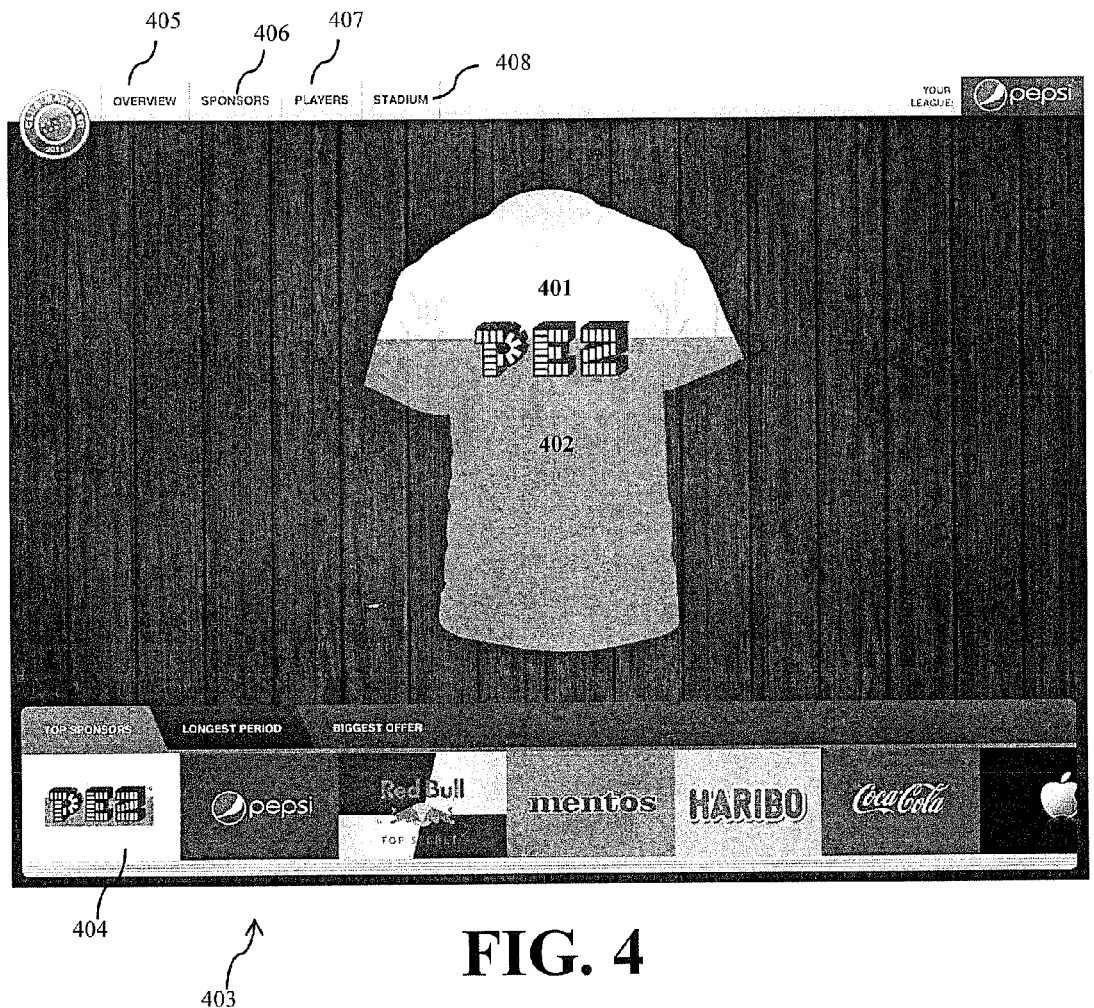
FIG. 3 shows strength levels a user can select from ranging from the first division, which is the most difficult division to a fourth division, FIG. 4 shown one example where different sponsor/potential advertisers are listed.

FIG. 4 shows one example of the user interface that may appear at the client computers 104-109 when the interactive social game program is running. The user may e.g. select between different selection functions 405-408 where the user may enter the overview 405 for the team, or select sponsors 406 where plurality of potential sponsors appear 404 where the user may scroll through the plurality of sponsors. The user may also enter the selection function players 407 where the user can study each individual player in the team, view statistical data associated to the players etc., the user may also select the stadium 408 and view the stadium and all information associated to the stadium. Other selection functions may of course also be provided, e.g. a selection command where the user is creating a new team as shown here. One example of process steps where user is starting the game for the first time is following:

Creating User Account:

The user may via a social communication side such as FACEBOOK®, establish an account where the user is e.g. given a username and account. After that, the interface that appears to the user may be different from the FACEBOOK® interface. When playing the game, the user logs into this account via this username and password. The user may of course also be registered in a different way such as communicating directly with the server shown in FIG. 1. The user may also download an application (app) to his/her mobile device such as mobile telephone or any portable device or to his/her home computer.

Creating a Club:

This step would typically be the process at the very beginning where the user creates his own club, but this might just as well occur later where as an example the user wants to start again from the very beginning because he/she did not done a good job in managing the previous club. In this example, the creating of the new club includes naming the club and naming the stadium for the club, selecting the country of origin, the language, the area and the competition the user wants to be part of.

Selecting a Division:

The user can select the strength of the division where he/she wants to play. As shown in FIG. 3 there may be four strength levels 301-304 ranging from the first division, which is the most difficult division to a fourth division, which is the weakest division. In one embodiment, all user may also automatically be set to the fourth division where the have to win each division or be one of the top two or three teams to move to the third/second/first division. Each division may as an example be a set of 12 teams, where an area is a set of 32 competitions.

Within each division there is a normal league setup. The user may have to compete with every team in the league where his/her team is for honors, the league title and against relegation. Winning the top division within each league is the ultimate goal of every user, also referred to as a manager. In one embodiment, within each competition there may also be a cup competition, where clubs from all leagues within that competition, compete against each other in a cup format competition where only one club will stand out in the end as a winner. Within each area there may be a competition amongst the best clubs in every competition, a kind of a Champions League where clubs from different competitions compete against each other. In one embodiment, there is no geospatial restriction on what division or competition the user's team can be a part of, but because this is a game where the social element is of utter importance, one should consider choosing a place among peers.

Mail Box:

When creating a new team/club as described above the user may be handed a mailbox in which the user may contact other users. The user may also be assigned assistants who will help you running the team. The assistants that the user may be provided with in the beginning may be "Assistant manager"—who'll take care of the team if the user by any chance forgets to log in before match day. The user may also seek advice from the assistant manager regarding the team. The assistants that the user may be provided with "Coach" who will take care of teams daily coaching, "Groundskeeper" who will take care of the stadium as much as he can.

Assistants are as different as they are many and they may all be rated as the players. In one embodiment, it may be possible to sack assistants and hire new (and hopefully better) ones. Other assistance may also be added such as physios, scouts, additional coaches, youth coaches, additional groundskeepers, etc. All these features mentioned here above are of course pre-programmed where some features are automatically associated to the user whereas other additional features such as selecting a new coach are performed via a selection command via said input unit where user via touch button/mouse click etc takes different decisions, e.g. fire a coach and employ a new one. Also, all these decisions affect the financial balance of the team, e.g. when buying a new coach that is rated high and is therefore more expensive, but this might be a wise investment because the team might in the coming matches win these matches and in that way get additional credit points.

In one embodiment, when creating a new team as discussed above, the user is assigned with 22 randomly selected players of various quality and age, e.g. two goalkeepers, six defenders, eight midfielders and six attackers. The aim of the game is then to take this team and make them champions. The user may also be assigned with youth facilities with 15 youth players (aged 15-18). They will not be able to compete with the regular team unless they sign a professional contract, where the user/manager will be able to track the progress of the youth players, the players that could make the future bright for the team.

Pre-Season Activities:

Pre-season is the time where the use prepares his team for a competitive and mind-tiring season, where the user needs to set goals for the coming season and assess different strategies strategies. This may be realized if the user logs into the game several times a day and selects different task, e.g. training task, mental training etc.

Choosing a Sponsor:

To insure revenue stream via said credit points for the user's club the team should make sure to have a team sponsor for the coming season. One should be able to choose from few different sponsors who will offer different sponsorship deals. As already addressed, FIG. 4 shown one example where different sponsor/potential advertisers 403 are listed. Assuming, as shown here, that the user has selected a uniform for his/her team with two colors 401, 402, and PEZ® as a sponsor, this logo will appear on the uniform, and maybe also at the stadium etc, i.e. all appearances where this team is competing as an example. This will not only be visualized towards the user of this team but also all other users located worldwide that are e.g. competing with this team. This selected sponsor will generate income for the users club via said credit points, where this main sponsorship deal may be at least one season long, even longer.

Training:

During pre-season one should train the intensively. By doing intensive training the players will gain skills and fitness needed for the coming season. The better coaches the team has the better the result from the training will be. In addition to this, the value of the players will with more training be increased as discussed previously.

Figure 5:
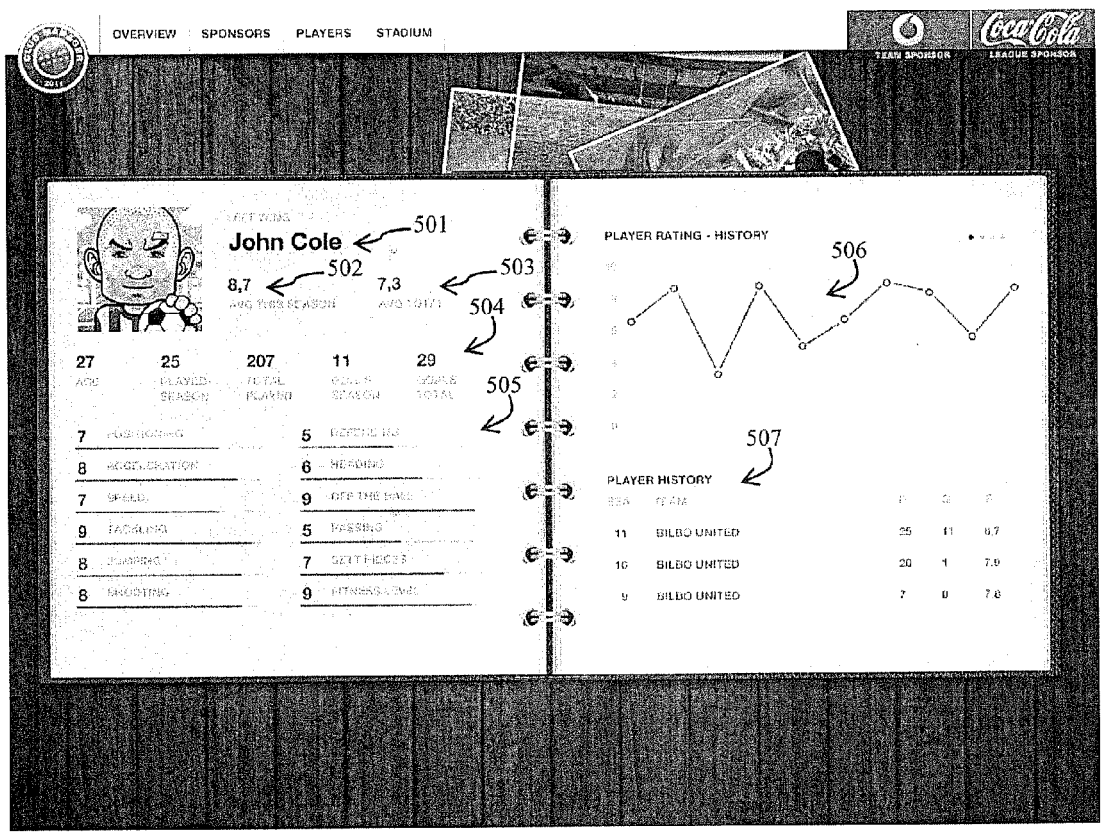
FIG. 5 shows on example of an interface of a player that is presented to user.

FIG. 5 shows on example of an interface of a player that is presented to the user by selecting this particular player vie e.g. mouse click or touch on a touch-sensitive screen. In this case, the player has been given the name "John Cole" statistical information such as the average grade 502 in this season "8.7" (in the scale 0-10 where 0 is the lowest and 10 the highest grade), the average grade 503 in total "7.3", other information 504 such as the age (27), the number of played seasons (25), total number of played matches (207), the number of goals in the season (11), the total number of goals (29), rating on different playing characteristics such as "positioning" is rated as 7, "acceleration is rated as" 8, "speed" as 7 etc. Referring to FIG. 1, this rating may be improved via e.g. appropriate training tactics etc. where the user may be presented with various training selections (not shown here) that the user can select between.

Shown is also the player rating history (506) and the player history 507, i.e. where he has been playing etc.

Figure 6:
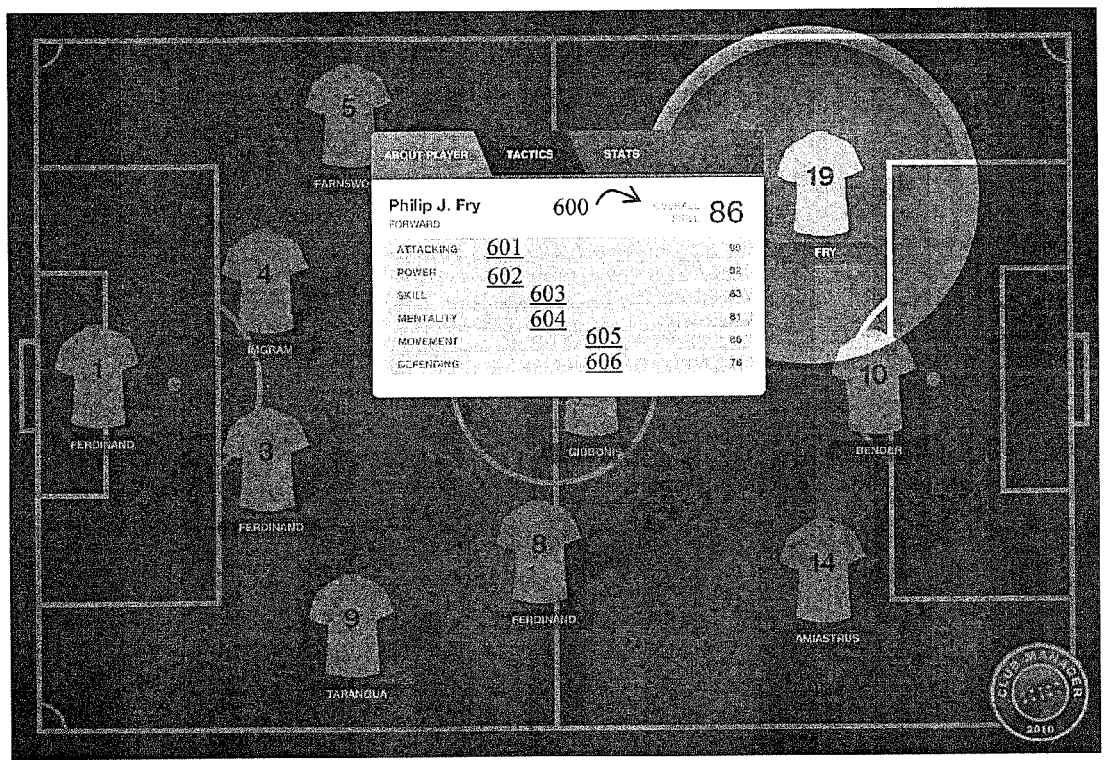
FIG. 6 shows another interface of a player showing the overall skill the player.

FIG. 6 shows another interface of a player showing the overall skill 600 marked as 86 (0 is the lowest and 100 is the highest level), various play characteristics are shown, "attacking" 601 marked as 90, "power" 602 marked as 92, "skill" 603 marked as 83, "mentality" 604 marked as 81, "movement" 605 marked as 86 and "defending" 606 marked as 76.

Engineering the Team:

It may be wise to use pre-season for gap analysis on the team. Where are the weaknesses and where are the strengths? Scout for players which could strengthen your team and shortlist them or make offers. Accordingly, the user should at this stage already start to prepare the team as whole and/or individual players for the coming season.

Stadium Improvements:

To further increase the revenue options for the team it may be possible to expand the stadium associated to the team in various ways, such as by increasing the number of seats so as to sell more tickets and increase gate revenues, and/or by adding souvenir shops or fast food kiosk to increase revenues from goods sold. Again, the user should however be careful because such investments will cost credit points, but the revenue of the team might also be increased through these investments.

Figure 7:
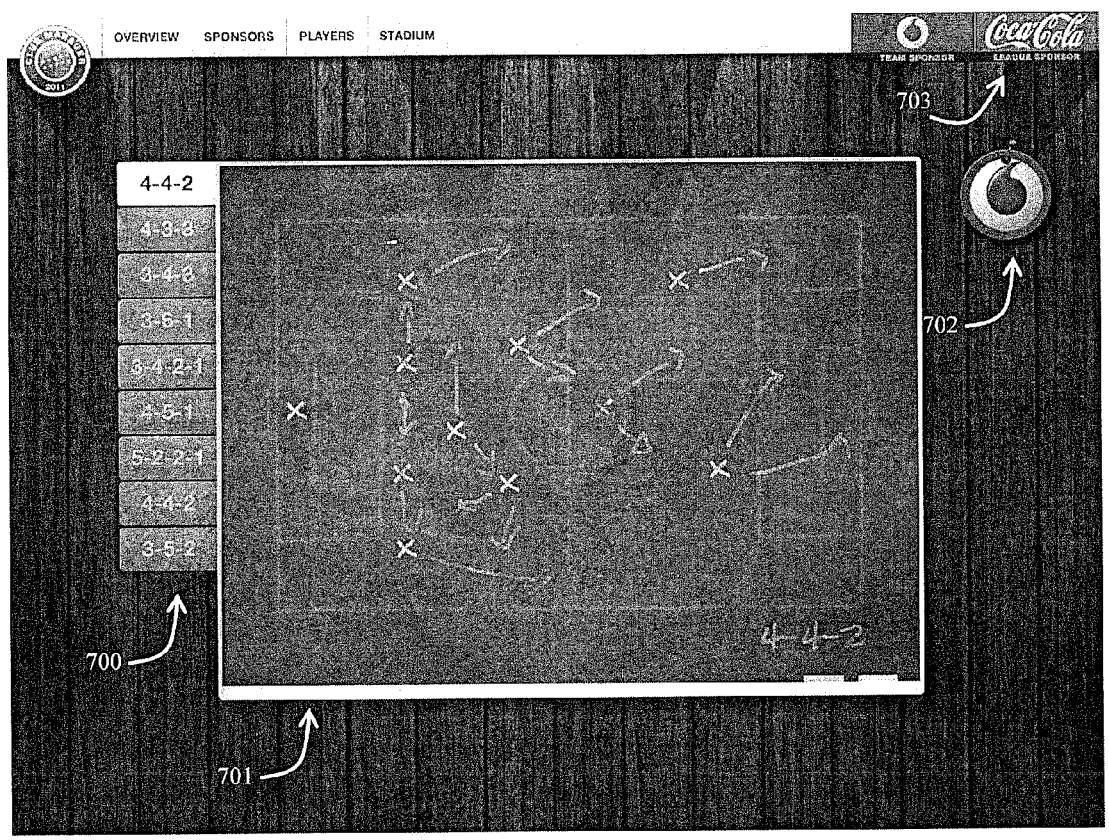
FIG. 7 shows an interface where a user is provided with several line-up options that he/she can select between, FIG. 8 shows a graphical presentation of a stadium and where a soccer match has ended.
Figure 8:
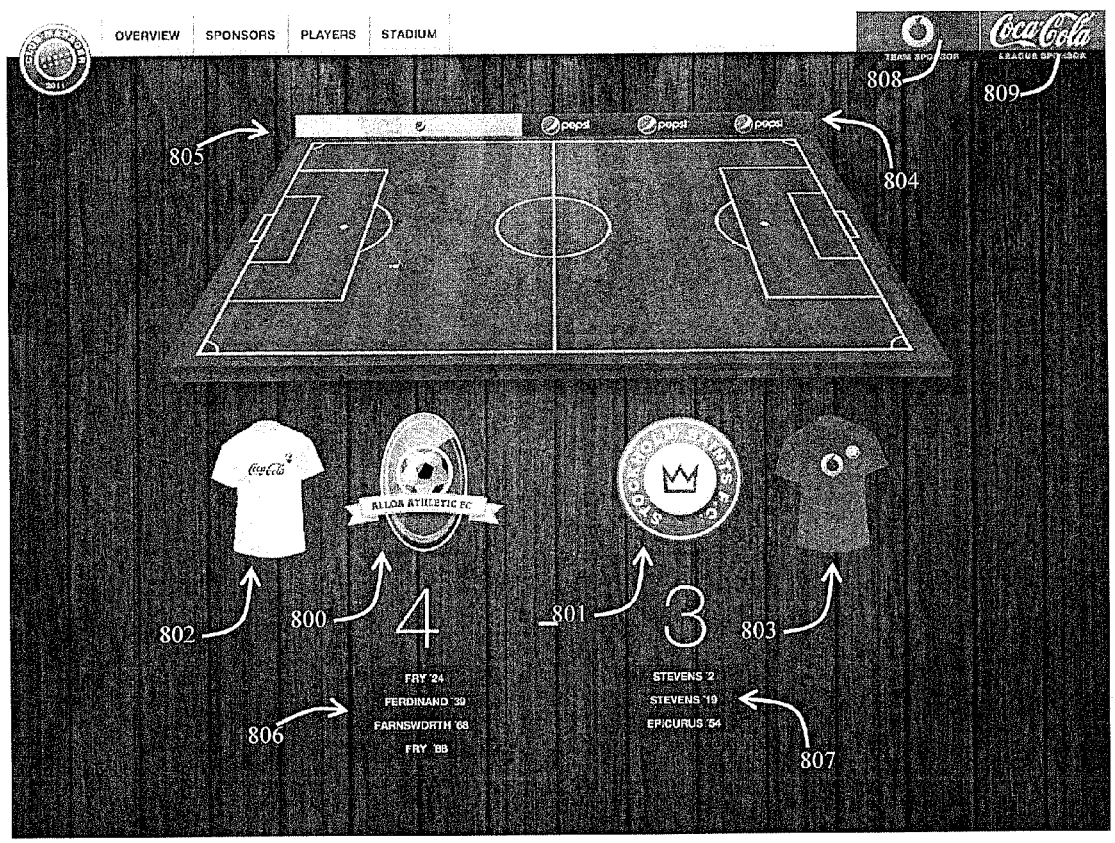

Match Day Preparation:

This is the place in the game process where the strategic minded user might prefer. In preparation for a typical match day there are few things the user should have in mind. Firstly, the user must study the opponent, but the user might get access to all the players in the other team, and study the opponent with respect to e.g. which tactics does play, is they an offensive or defensive team, where are they weaknesses etc. Based on this the user can set up line-up for the team such as whether the teams line-up should be defend line-up or offensive. As shown in FIG. 7 the user may be provided with several line-up options 700, such as 4-4-2 line-up which then appears visually to the user 701. The user may also select individual players based on this opponents study or the user may check out the youth development via said statistical data. Are there players there who have developed in to players who can contribute to your next match.

As shown here, the user might previously have selected COCA COLA® 703 and VODAFONE® 704 as sponsors, but the logos of these companies then appear at all times at the user interface.

To increase the revenue, the user might additionally sell stadium advertisements which are visible for those who visit the users stadium, namely said remaining users when e.g. competing with the user's team or when accessing information about the user's team. This is depicted graphically in FIG. 8 where two teams from two users are competing. One of the two users has selected COCA COLA® as sponsor and the other one has selected VODAFONE® as sponsor. Both these users have additionally, at the very beginning, created their own club names, "ALLOA ATHLETIC FC" 800 and "STOCKHOLM SAINTS F.C." 801. The football uniform 802 and 803 are also shown with their sponsor names. Moreover, these sponsor names are also shown as a part of the graphic 808 and 809 that appears at both the users side. As shown here, additional advertisement have also been sold and becomes a part of the stadium 804, 805, but these additional advertisements may give the user/owner of the stadium additional credit points. As shown here, the match ended 4 to 3 for ALLOA ATHLETIC FC. Below is a list of the players 806 and 807 who scored.

The time of playing the match may be pre-determined, e.g. on Wednesday at 8 p.m. The results of the match may, as shown here, simply be based on displayed a simple match report, where the user can drill down for further statistics and analyses. It is actually the processor that as an example collects all the data from both teams, preferably said statistical data about individual players as well as the line-up of the team, the information about the trainer etc. and utilizes this data as input in an algorithm that estimates which of the two teams are statistically a the better team. Therefore, if e.g. the user trains one of the team players in the wrong way so that the data associated to this user get worse it can then actually happen that this team looses a game.

In one embodiment, the user may by clicking on this list see a graphical presentation of the goals, where the processor of said system, may as an example randomly select goals from pool of goals stored at said database (see FIG. 1). This may be in a form of a pre-made video stream or more simply be a sketch.

The user may be provided with more detailed analysis/statistical info about the match e.g. ready made analytical reports etc.

FIG. 9 shows an overview of the previous league round where the user can see where his/her club ranks amongst the others and in that way the user can monitor the progress of his/her team.

Results in other matches should be of importance but they can be results from clubs who are in a direct competition with the user's club for honors. They can be results from clubs, which include players the user is keeping an eye on because he might want to buy them. They can be results from clubs that user's friends are managing. They may also be results from a match that the user's next opponent was playing.

Figure 10:
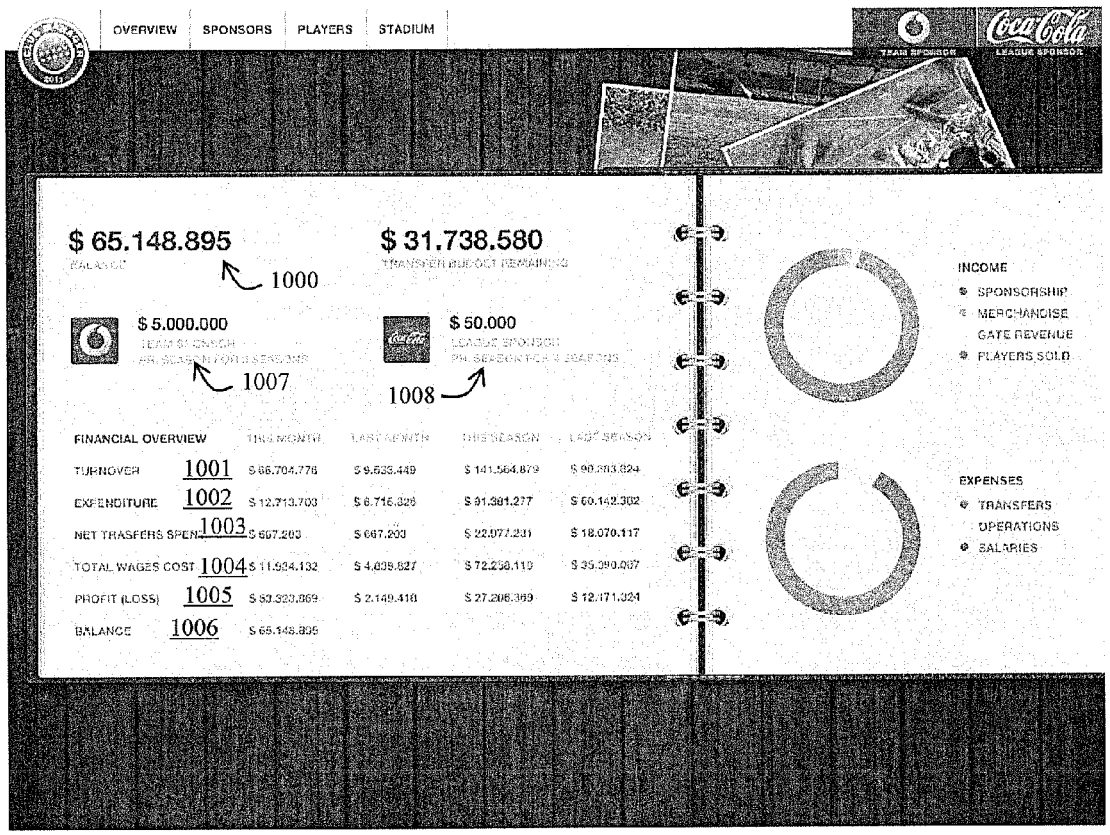
FIG. 10 shows a financial overview over the user's club where the user is provided with detailed information about various financial parameters.

FIG. 10 shows a financial overview over the user's club where the user is provided with detailed information about various financial parameters, such as the balance 1000, the amount received from team sponsor per season for three seasons 1007, league sponsor per seasons for four seasons 1008, the turnover 1001, expenditure 1002, net transfer spent 1003, total wages cost 1004, profit (loss) 1005 and balance 1006.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The invention claimed is:

1. An interactive game system comprising:
 a central server, wherein the central server is connected to a plurality of client computers by a communications network, each of said plurality of client computers being associated with and configured to be operated by a respective user of a plurality of users, each of the plurality of client computers including a graphical user interface with a display device and a user input unit,
 wherein the central server provides for each of said respective users to manage a respective team in a social game based on input received through a respective graphical user interface of a respective one of said client computers associated with and operated by said respective user, and wherein
 said central server includes a memory that stores promotions of interest from a plurality of potential advertisers,
 said central server includes an input unit that receives input commands from each of said users, said input commands being received through each of the respective user input units, indicating for each of said users a corresponding one of the promotions of interest, said central server includes a central processor that causes the execution of said social game in response to said input command, said central processor associates for each of said users said corresponding one of the promotions of interest, wherein the central server outputs a presentation of the selected promotion of each of said users to the others of said users to be presented visually through the display device of the graphical user interface of each of said client computers while said users play said interactive social game, wherein said managing of said respective teams includes said central server providing for each of said users to financially manage their respective team based on input received by said respective client computer based on a financial capacity of each of said respective teams, the financial capacity of each of said respective teams being based on virtual credit points added to each said team based in part on respective promotions displayed to said plurality of users, wherein the central server adds or removes one or more virtual credit points associated to the team in response to a decision event made by the user received from the respective client computer by said input unit, said decision event being an event different than said indication for each of said users of said corresponding one of the promotions of interest, and wherein said virtual credit points form a part of the financial capacity for said team and where the financial capacity may be increased or decreased via said decision event where virtual credit points are added or removed.

2. The interactive game system according to claim 1, wherein each of said respective teams to be managed is a sport team including of a plurality of sport team players.

3. The interactive game system according to claim 2, wherein said sport team is a soccer team.

4. The interactive game system according to claim 1, wherein said input unit receives a selection command from said user indicating a team selection and where said team associated to the user is based on said selection command.

5. The interactive game system according to claim 4, wherein said selection command is selected from two or more of the following:
naming of the team;
overtaking an existing team;
changing name of an existing team; and
selecting an outfit for the team.

6. The interactive game system according to claim 1, wherein, in the decision event one or more virtual credit points are added and associated to the team, and the decision event includes making a promotion deal to one or more of said potential advertisers.

7. The interactive game system according to claim 1, wherein, in the decision event one or more virtual credit points are added and associated to the team, and the decision event includes selling a player in the team.

8. The interactive game system according to claim 1, wherein, in the decision event one or more virtual credit points are added and associated to the team, and the decision event includes winning a game or tying game.

9. The interactive game system according to claim 1, wherein, in the decision event one or more virtual credit points are added and associated to the team, and the decision event includes:
an increase in a number of seats of a stadium associated to said sport team,
an increase in a number of ticket sales, and
an increase in a ticket price in home games.

10. The interactive game system according to claim 1, wherein, in the decision event one or more virtual credit points are added and associated to the team, and the decision event includes the user selecting another promotion from said plurality of potential advertisers, where at least two of said promotions have different associated virtual credit points.

11. The interactive game system according to claim 1, wherein, in the decision event virtual credit points are removed from the team, and the decision event includes making an investment in buying a new team player.

12. The interactive game system according to claim 1, wherein, in the decision event virtual credit points are removed from the team, and the decision event includes making an investment by increasing a number of seat of a stadium associated to said sport team.

13. The interactive game system according to claim 1, wherein, in the decision event virtual credit points are removed from the team, and the decision event includes losing a game.

14. The interactive game system according to claim 1, wherein, in the decision event virtual credit points are removed from the team, and the decision event includes making an investment by buying a new trainer for the team or making an investment by buying an assistant for the team.

15. The interactive game system according to claim 1, wherein the players of the team are associated with statistical data indicating their strength and weakness.

16. The interactive game system according to claim 1,
wherein the players of the team are associated with statistical data indicating their strength and weakness, and
wherein said statistical data are dynamical data that are automatically adjusted in favor or against the player in response to a task selected by the user.

17. The interactive game system according to claim 16, wherein the training task is selected from one or more of the following training tasks:
tactical training task;
physical training task; and
mental training task.

18. The interactive game system according to claim 16, wherein said statistical data are automatically adjusted in favor of the player by selecting the player in a starting lineup and increase the number of trainings.

19. A method performed in an interactive game system, the method comprising:
connecting a plurality of client computers to a central server by the communications network, each of said plurality of client computers being associated with and configured to be operated by a respective user of a plurality of users, each of the plurality of client computers including a graphical user interface with a display device and a user input unit, the central server providing for each of said respective users to manage a respective team in a social game based on input received by a respective one of said client computers associated with and operated by said respective user;
storing in a memory promotions of interest from a plurality of potential advertisers;
receiving by said central server input commands from each of said users user indicating for each of said users a corresponding one of the promotions of interest;

causing execution of said social game by a central processor of said central server in response to said input commands;

associating by said central processor associates for each of said users said corresponding one of the promotions of interest;

outputting by the central server outputs a presentation of the selected promotion of each of said users to the others of said users to be presented visually through the display device of the graphical user interface of each of said client computers while said users play said interactive social game;

providing by said central server for each of said users to financially manage their respective team based on input received by said respective client computer, said input commands being received through each of the respective user input units, the central server providing for each of said users to financially manage their respective team based on a financial capacity of each of said respective teams, the financial capacity of each of said respective teams being based on virtual credit points added to each said team based in part on respective promotions displayed to said plurality of users;

adding or removing by the central server one or more virtual credit points associated to the team in response to a decision event made by the user received from the respective client computer by said input unit, said decision event being an event different than said indication for each of said users of said corresponding one of the promotions of interest, and wherein said virtual credit points form a part of the financial capacity for said team and where the financial capacity may be increased or decreased via said decision event where virtual credit points are added or removed.

20. One or more non-transitory computer-readable mediums having stored thereon executable instructions that when executed by the one or more processors configure a computer system to perform at least the following:

connect a plurality of client computers to a central server by the communications network, each of said plurality of client computers being associated with and configured to be operated by a respective user of a plurality of users, each of the plurality of client computers including a graphical user interface with a display device and a user input unit, the central server providing for each of said respective users to manage a respective team in a social game based on input received by a respective one of said client computers associated with and operated by said respective user;

store in a memory promotions of interest from a plurality of potential advertisers;

receive by said central server input commands from each of said users user indicating for each of said users a corresponding one of the promotions of interest;

cause execution of said social game by a central processor of said central server in response to said input command;

associate by said central processor associates for each of said users said corresponding one of the promotions of interest;

output by the central server outputs a presentation of the selected promotion of each of said users to the others of said users to be presented visually through the display device of the graphical user interface of each of said client computers while said users play said interactive social game;

provide by said central server for each of said users to financially manage their respective team based on input received by said respective client computer, said input commands being received through each of the respective user input units, the central server providing for each of said users to financially manage their respective team based on a financial capacity of each of said respective teams, the financial capacity of each of said respective teams being based on virtual credit points added to each said team based in part on respective promotions displayed to said plurality of users;

add or remove by the central server one or more virtual credit points associated to the team in response to a decision event made by the user received from the respective client computer by said input unit, said decision event being an event different than said indication for each of said users of said corresponding one of the promotions of interest, and wherein said virtual credit points form a part of the financial capacity for said team and where the financial capacity may be increased or decreased via said decision event where virtual credit points are added or removed.

* * * * *